US011760048B2

(12) United States Patent
Kramer et al.

(10) Patent No.: US 11,760,048 B2
(45) Date of Patent: Sep. 19, 2023

(54) METHOD FOR PRODUCING A VEHICLE TIRE, VEHICLE TIRE PRODUCED ACCORDING TO THE METHOD, AND USE OF TREATED REINFORCING SUPPORTS

(71) Applicants: Continental Reifen Deutschland GMBH, Hannover (DE); Kordsa Teknik Tekstil Anonim Sirketi, Izmit/Kocaeli (TR)

(72) Inventors: Thomas Kramer, Herford (DE); Nermeen Nabih, Hannover (DE); Michael Schunack, Hannover (DE); Cornelia Schmaunz-Hirsch, Wunstorf (DE); Diana Pinto, Alfena (PT); Nacide Nurcin Vahir, Bagçesme-Izmit Kocaeli (TR); Mustafa Yasin Sen, Adapazari Sakarya (TR); Sadettin Fidan, Garbsen (DE); Yucel Ayyildiz, Izmit Kocaeli (TR); Basak Kanya, Izmit Kocaeli (TR)

(73) Assignees: Continental Reifen Deutschland GMBH; Kordsa Teknik Tekstil Anonim Sirketi

( * ) Notice: Subject to any disclaimer, the term of this patent is extended or adjusted under 35 U.S.C. 154(b) by 673 days.

(21) Appl. No.: 16/628,830

(22) PCT Filed: Dec. 7, 2017

(86) PCT No.: PCT/EP2017/081766
§ 371 (c)(1),
(2) Date: Jan. 6, 2020

(87) PCT Pub. No.: WO2019/015792
PCT Pub. Date: Jan. 24, 2019

(65) Prior Publication Data
US 2020/0130306 A1 Apr. 30, 2020

(30) Foreign Application Priority Data

Jul. 20, 2017 (DE) ...................... 10 2017 212 455.5

(51) Int. Cl.
*B29D 30/40* (2006.01)
*B29B 15/12* (2006.01)
*B29D 30/38* (2006.01)
*B60C 1/00* (2006.01)
*C09D 107/00* (2006.01)
*D06M 13/395* (2006.01)
*D06M 15/263* (2006.01)
*D06M 15/55* (2006.01)
*D06M 15/693* (2006.01)
*D06M 101/32* (2006.01)
*D06M 101/34* (2006.01)

(52) U.S. Cl.
CPC ............ *B29D 30/40* (2013.01); *B29B 15/125* (2013.01); *B29D 30/38* (2013.01); *B60C 1/0041* (2013.01); *C09D 107/00* (2013.01); *D06M 13/395* (2013.01); *D06M 15/263* (2013.01); *D06M 15/55* (2013.01); *D06M 15/693* (2013.01); *B29D 2030/383* (2013.01); *B60C 2001/0066* (2013.01); *D06M 2101/32* (2013.01); *D06M 2101/34* (2013.01)

(58) Field of Classification Search
None
See application file for complete search history.

(56) References Cited

U.S. PATENT DOCUMENTS

| 3,854,515 | A | 12/1974 | Takemura et al. |
| 5,880,242 | A | 3/1999 | Hu et al. |
| 8,236,875 | B2 | 8/2012 | Recker et al. |
| 8,252,863 | B2 | 8/2012 | Hasse et al. |
| 2015/0259580 | A1 | 9/2015 | Cevahir et al. |
| 2015/0315410 | A1 | 11/2015 | Bas et al. |

(Continued)

FOREIGN PATENT DOCUMENTS

| CN | 102414362 A | 4/2012 |
| DE | 69722388 T2 | 4/2004 |

(Continued)

OTHER PUBLICATIONS

Kao Corporation Polycarboxylic acid based polymer, 2019, Kao Corporation (Year: 2019).*
International Search Report and Written Opinion for International Application No. PCT/EP2017/081766, dated Mar. 19, 2018, 8 pages.
Chinese Office Action for Chinese Application No. 201780093305.3, dated Nov. 17, 2021 with translation. 20 pages.
Reconsideration Report by Examiner before Appeal for Japanese Application No. 2019-572575, dated Feb. 1, 2022, with translation, 7 pages.

(Continued)

*Primary Examiner* — Jacob T Minskey
*Assistant Examiner* — Adrien J Bernard
(74) *Attorney, Agent, or Firm* — RatnerPrestia

(57) ABSTRACT

A method for producing a vehicle tire, having the following steps: a) providing textile reinforcing supports; b) providing a bath which is free of resorcin and formaldehyde by at least: b1) adding at least one carboxylic acid to water; b2) adding at least one base; b3) adding at least one epoxy compound; b4) adding at least one polyisocyanate compound; b5) adding at least one VP latex; and b6) mixing the substances from b1) to b5); c) dipping the reinforcing supports from step a) into the bath from step b); d) subsequently hot-stretching the dipped reinforcing supports from step c); and e) further processing the reinforcing supports from step d) in order to form a reinforcing support layer in a vehicle tire blank. A vehicle tire which is produced using the method and to the use of reinforcing supports treated in such a manner in technical rubber articles are also disclosed.

13 Claims, No Drawings

(56) References Cited

U.S. PATENT DOCUMENTS

| | | |
|---|---|---|
| 2016/0288577 A1 | 10/2016 | Reese |
| 2017/0130396 A1 | 5/2017 | Cevahir et al. |

FOREIGN PATENT DOCUMENTS

| | | |
|---|---|---|
| DE | 102006004062 A1 | 8/2007 |
| DE | 102008037714 A1 | 2/2010 |
| DE | 102014211365 A1 | 12/2015 |
| DE | 102014225821 A1 | 6/2016 |
| EP | 2589619 A1 | 5/2013 |
| EP | 2955268 A1 | 12/2015 |
| JP | 4925604 A | 3/1974 |
| JP | 2012007266 A | 1/2012 |
| JP | 2012224962 A | 11/2012 |
| JP | 2016537243 A | 12/2016 |
| WO | 9909036 A1 | 2/1999 |
| WO | 2005026239 A1 | 3/2005 |
| WO | 2008083241 A2 | 7/2008 |
| WO | 2008083242 A1 | 7/2008 |
| WO | 2008083243 A1 | 7/2008 |
| WO | 2008083244 A1 | 7/2008 |
| WO | 2014091376 A1 | 6/2014 |

OTHER PUBLICATIONS

Indian Examination Report for Indian Application No. 202017001437, dated Mar. 1, 2021 with translation, 5 pages.

Chinese Office Action for Chinese Application No. 201780093305.3, dated Apr. 2, 2021 with translation, 22 pages.

Notice of Reasons for Refusal for Japanese Application No. 2019-572575. dated Dec. 21, 2020, with translation, 6 pages.

* cited by examiner

METHOD FOR PRODUCING A VEHICLE TIRE, VEHICLE TIRE PRODUCED ACCORDING TO THE METHOD, AND USE OF TREATED REINFORCING SUPPORTS

CROSS REFERENCE TO RELATED APPLICATIONS

This application is the U.S. National Phase of PCT International Application No. PCT/EP2017/081766, filed Dec. 7, 2017, which claims priority to German Patent Application No. 10 2017 212 455.5, filed Jul. 20, 2017, the contents of such applications being incorporated by reference herein.

FIELD OF THE INVENTION

The invention relates to a method of producing a motor vehicle tyre and to a motor vehicle tyre produced by the method. The invention further relates to the use of treated strengthening members.

BACKGROUND OF THE INVENTION

It is known that motor vehicle tyres, in various components, have strengthening members for reinforcement. Industrial rubber articles such as belts, transmission belts and hoses also have strengthening members.

The strengthening members are typically surrounded by at least one rubber mixture which is also referred to as rubberizing mixture. One problem is that the strengthening members and the surrounding rubberizing mixture have different strengths. Especially under ongoing mechanical and dynamic stress, as in driving operation of the motor vehicle tyre, therefore, adequate bonding between strengthening members and the surrounding rubberizing mixture is necessary.

The prior art discloses activation of the strengthening members prior to rubberization for adequate bonding (activation of bonding), typically by using what are called RFL (resorcinol-formaldehyde latex) dips through which the strengthening members are dipped.

In addition, blocked isocyanate and/or epoxy compounds among others are used in combination with RFL dips in order to preactivate or further activate the strengthening members. WO 2005/026239 A1, incorporated by reference, discloses, for example, the use of polyisocyanates and RFL devoid of epoxy compounds.

However, resorcinol and formaldehydes are classified as being harmful to the environment and health, and so efforts are being made to provide alternatives thereto. For instance, DE 102014211365 A1, incorporated by reference, discloses the treatment of textile weave or textile strengthening members with a malein-functionalized polymer in order to achieve improved bonding to rubber mixtures in strengthening member plies of motor vehicle tyres.

In the prior art, however, the production of motor vehicle tyres, especially when non-preactivated strengthening members are used, usually requires two different dips in succession, in order to activate the strengthening members sufficiently for bonding to the respective rubber mixtures comprising natural rubber (NR), synthetic polyisoprene (IR), butadiene rubber (BR) and/or styrene-butadiene rubber (SBR).

SUMMARY OF THE INVENTION

Therefore, an aspect of the present invention is a method of producing a motor vehicle tyre comprising at least one strengthening member ply having textile strengthening members, in which substances harmful to health and the environment are to be dispensed with, and which is additionally comparatively simple. At the same time, the bonding between strengthening members and rubberizing mixture is not to be significantly adversely affected or is even likewise to be improved.

DETAILED DESCRIPTION OF PREFERRED EMBODIMENTS

An aspect of the invention is a method of producing a motor vehicle tyre comprising at least one strengthening member ply having textile strengthening members, wherein the method comprises at least the following method steps:
a) providing textile strengthening members;
b) providing a bath free of free resorcinol and resorcinol precondensates, especially resorcinol-formaldehyde precondensates, and free of free formaldehyde and formaldehyde-releasing substances, by means of at least the following method steps:
b1) adding at least one polycarboxylic acid to water; and
b2) adding at least one base; and
b3) adding at least one epoxy compound; and
b4) adding at least one polyisocyanate compound; and
b5) adding at least one VP latex; and
b6) mixing the substances from b1) to b5);
c) dipping the strengthening members from step a) in the bath from step b);
d) subsequently hot-drawing the dipped strengthening members from step c);
e) further processing the strengthening members from step d) to give a strengthening member ply in a green motor vehicle tyre;
f) vulcanizing the green motor vehicle tyre.

By virtue of the bath from step b) comprising the polycarboxylic acid, epoxy compound, polyisocyanate compound and VP latex substances, it is also possible, in the production of the motor vehicle tyre, to dip non-preactivated strengthening members in this one bath only.

Said constituents enable, in their combination, a multitude of chemical reactions by which the strengthening members that are dipped therein undergo good activation of bonding. At the same time, it is especially possible, in the production of the motor vehicle tyre, to dispense with free resorcinol and resorcinol precondensates, especially resorcinol-formaldehyde precondensates, and free formaldehyde and formaldehyde-releasing substances, i.e. with the substances that were or are present in prior art bath/dips of this kind and which are classified as harmful to health and the environment.

The method according to an aspect of the invention for production of the motor vehicle tyre is thus comparatively simple and benign to health and the environment, with simultaneous achievement of comparable service life of the motor vehicle tyre.

In step a), textile strengthening members are provided in the method according to an aspect of the invention. These may in principle be any textile strengthening members that ensure adequate reinforcement in motor vehicle tyres. It is preferable that the textile strengthening members in step a) are selected from the group consisting of polyethylene terephthalate (PET), polyethylene naphthalate (PEN), polybutylene terephthalate (PBT), polycarbonate (PC), celluloses, regenerated celluloses, cellulose esters, carbon fibres, polyketones, m-aramid, p-aramid, mixtures of m-aramid and p-aramid, and polyamides selected from the group consisting of nylon-4,6 (PA 4.6), nylon-4,10 (PA 4.10), nylon-6 (PA 6), nylon-6,6 (PA 6.6 polyhexamethyleneadipamide), nylon-6,12 (PA 6.12), nylon-10,10 (PA 10.10) and nylon-12,12 (PA 12.12), also including a combination of two or more of all the textile strengthening members mentioned.

It is thus possible for the strengthening member ply to be produced for motor vehicle tyres also to have, for example, hybrid cords made from different textile yarns, for example hybrid cords made from PET and nylon-6,6 (PA 6.6 polyhexamethyleneadipamide).

More preferably, the textile strengthening members comprise polyethylene terephthalate (PET) and/or cellulose and/or regenerated cellulose and/or cellulose esters and/or nylon-6,6 (PA 6.6 polyhexamethyleneadipamide).

Preferred regenerated celluloses are known by the name "rayon".

The textile strengthening members are preferably cords having at least one twisted yarn.

In this context, all finenesses (titre in the unit dtex) and ways of twisting the cords and yarns that are known in the prior art are conceivable. It is appropriate when the titre of each and every yarn is between 200 and 5000 dtex and when the twist of the yarns and cords is between 100 and 800 t/m.

The textile strengthening members preferably already have the properties mentioned prior to method step a), meaning that they are preferably first twisted and then treated by method steps a) et seq.

If the textile strengthening members are embedded into the rubberizing mixture as a weave, as known to those skilled in the art, there is preferably a weaving step after the twisting and prior to the treatment in method steps a) to f).

In a further development of an aspect of the invention, the strengthening members are cords each made from one yarn, which means that one twisted yarn constitutes each cord.

In a further preferred development of an aspect of the invention, the strengthening members are cords made from at least two, more preferably two, yarns.

In a further preferred development of an aspect of the invention, the strengthening member ply produced in step e) or that of the motor vehicle tyre produced in accordance with an aspect of the invention comprises cords made from different numbers of yarns as strengthening members.

In step b), a bath free of free resorcinol and resorcinol precondensates, especially resorcinol-formaldehyde precondensates, and free of free formaldehyde and formaldehyde-releasing substances, is provided. The expression "free of" here means that the bath contains 0% to 0.1% by weight, but preferably 0% by weight, of substances of this kind, where the maximum amount is based in each case on the individual substance.

In step b), by means of the above-detailed steps b1) to b5), the essential constituents are combined to give a composition, i.e. to give a bath, and mixed in b6). In this case, the listing b1) to b5) is not intended to impose any sequence in time. It is also possible for there to be an additional mixing step (analogously to b6)) in between or for the constituents to be added in groups.

It is preferable, however, that the VP latex and any optional additional latex are added at a pH of 5 to 11. At pH values above 5, the formation of agglomerates is avoided.

In step b1), at least one polycarboxylic acid is added to water or at least one polycarboxylic acid is provided in water. By comparison with baths from the prior art, the polycarboxylic acid enables additional chemical reactions, including in interplay with the other constituents mentioned, such as acid/epoxy, acid/isocyanate, alcohol/isocyanate reactions. Alcohol groups are introduced into the reaction system by the reaction of the polycarboxylic acid with the epoxy compound.

Preferably, the polycarboxylic acid in step b1) is based to an extent of 10 to 100 mol %, more preferably 30 to 100 mol %, even more preferably 50 to 100 mol %, preferably in turn 70 to 100 mol %, even more preferably in turn 90 to 100 mol %, on monomers containing carboxylic acid groups. In a particularly advantageous embodiment of the invention, the polycarboxylic acid in step b1) is based to an extent of 100 mol % on monomers containing carboxylic acid groups, without ruling out further functional groups.

As a result of this, the activation of bonding of the strengthening members in the motor vehicle tyre produced in accordance with an aspect of the invention is particularly effective; more particularly, the chemical reactions mentioned can take place to a high degree.

Preferably, the polycarboxylic acid in step b1) has a weight-average molecular weight Mw by GPC of 1000 to 500 000 g/mol, preferably 3000 to 100 000 g/mol.

Preferably, the polycarboxylic acid is based on acrylic acid, methacrylic acid, itaconic acid, crotonic acid, cinnamic acid and/or maleic acid monomers.

In a preferred embodiment, the polycarboxylic acid (based on acrylic acid monomers) is an acrylic resin.

More preferably, the polycarboxylic acid includes a polyalcohol as crosslinker.

Particularly suitable polycarboxylic acids based on acrylic acid monomers (acrylic resin comprising carboxylic acid groups) that contain a polyalcohol are available, for example, under the Acrodur 950 L and Acrodur DS 3530 trade names from BASF Corp.

In step b2), according to an aspect of the invention, at least one base is added. More particularly, the base is to be used to set a pH of 5 to 11, preferably 7 to 11.

The base is preferably a volatile base which evaporates, or the constituents of which evaporate, during the method.

In a particularly advantageous embodiment of the invention, the base in step b2) is ammonium hydroxide, i.e. an aqueous solution of ammonia. This activates the polycarboxylic acid for the abovementioned chemical reactions, and ammonia evaporates during the method.

In step b3), according to an aspect of the invention, at least one epoxy compound is added. Epoxy compounds as a constituent of bath/dips for textile strengthening members are known to those skilled in the art. It is preferable in the context of an aspect of the present invention for the epoxy compound in step b3) to be selected from the group consisting of glycidyl-based glycerol, sorbitol-based epoxy compounds, phenol-based novolak epoxy compounds and cresol-based novolak epoxy compounds.

These compounds are particularly suitable for taking part in the complex chemical reactions, especially with the polycarboxylic acid, and therefore make a particularly effective contribution to activating the bonding of the strengthening members of the motor vehicle tyre produced in accordance with an aspect of the invention.

A particularly suitable example is a glycerol-based polyglycidyl ether, for example Denacol™ EX-313, which is described inter alia in DE 69722388 T2, incorporated by reference.

In step b4), according to an aspect of the invention, at least one polyisocyanate compound is added. Polyisocyanate compounds as a constituent of bath/dips for textile strengthening members are known to those skilled in the art.

The polyisocyanate compound may be in blocked form or be in the form of a dimer or higher homologue, i.e. in "self-blocked" form.

Blocked polyisocyanates are, for example and with preference, obtained by blocking free isocyanates with at least one substance selected from the group comprising phenol, thiophenol, chlorophenol, cresol, resorcinol, p-sec-butylphenol, p-tert-butylphenol, p-sec-amylphenol, p-octylphenol, p-nonylphenol, tert-butyl alcohol, diphenylamine, dimethylaniline, phthalimide, δ-valerolactam, ε-caprolactam, dialkyl malonate, acetylacetone, alkyl acetoacetate, acetoxime, methyl ethyl ketoxime, 3,5-dimethylpyrazole, cyclohexanone oxime, 3-hydroxypyridine and acidic sodium sulfite.

It is preferable in the context of an aspect of the present invention for the polyisocyanate compound in step b4) to comprise units selected from the group consisting of tetramethylene diisocyanate, hexamethylene diisocyanate, diphenylmethane 4,4'-diisocyanate, octamethylene diisocyanate, decamethylene diisocyanate, dodecamethylene diisocyanate, aromatic diisocyanates comprising toluene 2,4- or 2,6-diisocyanate, tetramethylxylylene diisocyanate, p-xylene diisocyanate, 2,4'- or 4,4'-diisocyanatodiphenylmethane, phenyl 1,3- or 1,4-diisocyanate.

In step b5), according to an aspect of the invention, at least one VP latex is added. VP latex is known to those skilled in the art. "VP" stands for "vinylpyridine", and known VP latices may also include additional monomers. A preferred example of a VP latex is a vinylpyridine latex which typically comprises 15% vinylpyridine, 15% styrene and 70% butadiene monomers.

As well as the VP latex added in accordance with an aspect of the invention, it is also possible for one or more additional latices to be added to the bath in step b), for instance a styrene-butadiene latex.

Especially by means of a styrene-butadiene latex as further latex, optimization of the composition is possible without losses in the properties.

Preferably, the butadiene component is selected from the group consisting of 1,3-butadiene and 2-methyl-1,3-butadiene. The styrene component is preferably selected from the group consisting of styrene α-methylstyrene, 2-methylstyrene, 3-methylstyrene, 4-methylstyrene, 2,4-diisopropylstyrene, 2,4-dimethylstyrene, 4-t-butylstyrene and hydroxymethylstyrene. The vinylpyridine monomer is preferably selected from the group consisting of 2-vinylpyridine, 3-vinylpyridine, 4-vinylpyridine, 2-methyl-5-vinylpyridine and 5-ethyl-2-vinylpyridine.

In addition, it is conceivable that carboxylated VP latex and/or carboxylated styrene-butadiene latex is additionally added, "carboxylated" meaning that said latices can bear carboxylic acid groups as functional groups.

As a result of this, the reaction system as described above is supported further, such that the activation of bonding is further optimized.

In step b6), the constituents are mixed with one another, although it is also possible as set out above to conduct intermediate mixing steps.

The substances are mixed in a manner known to those skilled in the art.

The amounts of the individual substances mentioned can vary according to the amount and molecular weights. It is particularly preferable when the bath from step b6) contains the polycarboxylic acid in an amount of 0.1%-10% by weight, preferably 0.1%-2% by weight, the epoxy compound in an amount of 0.1% to 2% by weight, the polyisocyanate compound in an amount of 0.7% to 3% by weight, and the at least one VP latex in an amount of 6% to 25% by weight. The remainder may especially be water or additional substances may be present, such as the styrene-butadiene latex mentioned and/or tackifiers and/or anti-foaming agents. The use of the optional substances mentioned and the amounts thereof are guided by the textile material of the strengthening members and the desired properties in the production, i.e. during the method, and later in use, such as especially in the tyre.

In step c), according to an aspect of the invention, the strengthening members from step a) are dipped in the bath from step b). This activates the bonding of the textile strengthening members for a good service life in the motor vehicle tyre.

The dipping is effected in a manner known to those skilled in the art using known devices.

The strengthening members provided in step a) need not be activated in advance by an additional dipping step.

The strengthening members may, however, be activated in advance. Especially in the case of non-preactivated textile materials, it may be found to be advantageous to dip the strengthening members in a bath comprising one or more epoxy compounds and one or more polyisocyanate compounds prior to the dipping in the bath from step b). This results in an additional dipping step, but at the same time the activation of bonding for attachment to a rubber mixture/rubberizing mixture in the motor vehicle tyre is further optimized.

In step d), according to an aspect of the invention, the dipped strengthening members from step c) are subsequently hot-drawn. This is likewise effected using known devices—such as especially 1- or 2-zone ovens, through which the strengthening members are preferably conducted continuously—and in a manner adapted to the textile materials in each case. The temperature in the hot-drawing is preferably 100 to 260° C.

It is also possible here to conduct two or more thermal treatments at different temperatures in succession.

Preferably and by way of example, dipped strengthening members made from nylon (PA 6.6) as textile material are treated at 180 to 210° C. for 30 to 60 seconds and then at 220 to 260° C. for 20 to 100 seconds.

A further advantage of an aspect of the invention is that the dipped strengthening member, especially cord, does not show any apparent discolouration, which enables the production of strengthening members in various colours through addition of dyes. This can be utilized, for instance, for better marketing of products or in the further processing of the dipped strengthening members, for example for avoidance of inadvertent switching.

In step e), according to an aspect of the invention, the strengthening members from step d) are processed further to give a strengthening member ply in a green motor vehicle tyre. In this context, the manner of further processing is guided especially by the component of the motor vehicle tyre in which the strengthening member ply is being used. More particularly, and in a preferred embodiment of the invention, the strengthening members from step d) are ensheathed with a rubberizing mixture.

For this purpose, the rubberizing mixture preferably comprises at least one diene rubber which is more preferably selected from the group consisting of natural polyisoprene (NR) and/or synthetic polyisoprene (IR) and/or butadiene rubber (BR) and/or styrene-butadiene rubber (SBR), and preferably 20 to 90 phr of at least one filler, preferably selected from the group consisting of carbon black and silica.

The diene rubbers may be all diene rubbers known to those skilled in the art from the abovementioned group.

The rubberizing mixture may comprise polyisoprene (IR, NR) as diene rubber. This may be either cis-1,4-polyisoprene or 3,4-polyisoprene. Preference is given, however, to the use of cis-1,4-polyisoprenes with a cis-1,4 content >90% by weight. Firstly, it is possible to obtain such a polyisoprene by stereospecific polymerization in solution with Ziegler-Natta catalysts or using finely divided lithium alkyls. Secondly, natural rubber (NR) is one such cis-1,4-polyisoprene; the cis-1,4 content in the natural rubber is greater than 99% by weight.

If the rubberizing mixture contains polybutadiene (BR) as diene rubber, this may be either cis-1,4-polybutadiene or vinyl polybutadiene (vinyl content about 10%-90% by weight). Preference is given to the use of cis-1,4-polybutadiene with a cis-1,4 content greater than 90% by weight, which can be prepared, for example, by solution polymerization in the presence of catalysts of the rare earth type.

Further usable diene rubbers are styrene-butadiene copolymers. The styrene-butadiene copolymers may be solution-polymerized styrene-butadiene copolymers (S-SBR) having a styrene content, based on the polymer, of about 10% to 45% by weight and a vinyl content (content of 1,2-bonded butadiene, based on the overall polymer) of 10% to 70% by weight, which can be prepared, for example, using lithium alkyls in organic solvent. The S-SBR may also be coupled and endgroup-modified. It is alternatively possible to use emulsion-polymerized styrene-butadiene copolymers (E-SBR) and mixtures of E-SBR and S-SBR. The styrene content of the E-SBR is about 15% to 50% by weight, and it is possible to use the products known from the prior art that have been obtained by copolymerization of styrene and 1,3-butadiene in aqueous emulsion.

The diene rubbers used in the mixture, especially styrene-butadiene copolymers, can also be used in partly or fully functionalized form. The functionalization can be effected with groups which can interact with the fillers used, especially with fillers bearing OH groups. Functionalizations may, for example, be those with hydroxyl groups and/or epoxy groups and/or siloxane groups and/or amino groups and/or phthalocyanine groups and/or carboxyl groups and/or silane sulfide groups.

The rubberizing mixture preferably contains 25 to 100 phr, more preferably 50 to 100 phr, more preferably in turn 70 to 100 phr, of natural polyisoprene and/or synthetic polyisoprene, preference being given here to natural polyisoprene.

In a preferred development of an aspect of the invention, the rubberizing mixture contains 100 phr of at least one natural polyisoprene (NR) and/or synthetic polyisoprene (IR), which means that a mixture of NR and IR is also conceivable.

In a further preferred development of an aspect of the invention, the rubberizing mixture contains 25 to 85 phr of at least one natural and/or synthetic polyisoprene and 15 to 50 phr of at least one butadiene rubber and/or 15 to 50 phr of at least one styrene-butadiene rubber. Especially with these rubbers, and especially in strengthening member plies of motor vehicle tyres, very good physical properties of the rubberizing mixture are found in terms of processability, service life and tear properties, while an adequate level of bonding is achieved.

The expression phr (parts per hundred parts of rubber by weight) used in this text is the standard unit of amount for blend recipes in the rubber industry. The dosage of the parts by weight of the individual substances is always based here on 100 parts by weight of the total mass of all rubbers present in the mixture. The mass of all rubbers present in the mixture adds up to 100.

In an advantageous embodiment of the invention, the rubberizing mixture contains 50 to 100 phr of at least one natural polyisoprene and/or synthetic polyisoprene and 30 to 90 phr of at least one carbon black. This gives rise to particularly good structural service life of the strengthening member ply produced, especially in use in motor vehicle tyres.

It is also possible for small amounts, 0 to 10 phr, and in a preferred embodiment from 0.1 to 10 phr, of further fillers such as aluminosilicates, chalk, starch, magnesium oxide, titanium dioxide or rubber gels to be present.

It is additionally conceivable for the rubber mixture to comprise carbon nanotubes (CNT) including discrete CNTs, known as hollow carbon fibers (HCF), and modified CNTs containing one or more functional groups such as hydroxyl, carboxyl and carbonyl groups).

Graphite and graphenes, and also "carbon-silica dual-phase filler", are also conceivable as filler.

Preferably, however, the rubberizing mixture is free of these further fillers, i.e. contains preferably 0 to 0.001 phr of these further fillers.

Zinc oxide in the context of an aspect of the present invention is not considered as a filler.

If carbon black is used in the rubberizing mixture, it is preferably those types that have an STSA surface area (to ASTM D6556) of more than 30 $m^2/g$, preferably 30 to 120 $m^2/g$. These can be mixed in in a simple manner and ensure low buildup of heat.

In a preferred development of an aspect of the invention, the rubberizing mixture comprises at least one carbon black having an iodine adsorption number to ASTM D1510 of 40 to 110 g/kg and an STSA surface area (to ASTM D 6556) of 40 to 120 $m^2/g$. With a carbon black of this kind, particularly because of the comparatively high surface area, adequate reinforcement and strength of the rubberizing mixture is achieved, in order to compensate as well as possible for differences in strength between strengthening members and the rubber of the rubberizing mixture. A possible preferred carbon black type is, for example, the carbon black N326 having an iodine adsorption number to ASTM D 1510 of 82 g/kg and an STSA surface area (to ASTM D 6556) of 76 $m^2/g$. A further possible preferred carbon black type is, for example, the carbon black N660 having an iodine adsorption number to ASTM D 1510 of 36 g/kg and an STSA surface area (to ASTM D 6556) of 34 $m^2/g$.

If silicas are present in the mixture, they may be the silicas that are customary for tyre rubber mixtures. It is particularly preferable when a finely divided, precipitated silica is used, having a CTAB surface area (to ASTM D 3765) of 30 to 350 $m^2/g$, preferably of 120 to 250 $m^2/g$. Silicas used may be either conventional silica, such as those of the VN3 type (trade name) from Evonik, or highly dispersible silicas known as HD silicas (e.g. Ultrasil 7000 from Evonik). Silicas are preferably used in amounts of less than 15 phr.

To improve processibility and for binding of the silica and any other polar fillers present to the diene rubber, it is possible to use silane coupling agents in rubber mixtures. It is possible here to use one or more different silane coupling agents in combination with one another. The rubberizing mixture can thus contain a mixture of various silanes.

The silane coupling agents react with the surface silanol groups of the silica or other polar groups during mixing of the rubber or of the rubber mixture (in situ) or in a pretreatment (premodification) even before addition of the filler to the rubber. As silane coupling agents, it is possible to use all silane coupling agents which are known to those skilled in the art for use in rubber mixtures. Such coupling agents known from the prior art are bifunctional organosilanes which have at least one alkoxy, cycloalkoxy or phenoxy group as leaving group on the silicon atom and have, as other function, a group which can, optionally after dissociation, undergo a chemical reaction with the double bonds of the polymer. The latter group can be, for example, one of the following chemical groups:

—SCN, —SH, —NH$_2$ or —S$_x$— (where x=2 to 8).

For instance, silane coupling agents used may, for example, be 3-mercaptopropyltriethoxysilane, 3-thiocyanatopropyltrimethoxysilane or 3,3'-bis(triethoxysilylpropyl) polysulfides having 2 to 8 sulfur atoms, e.g. 3,3'-bis(triethoxysilylpropyl) tetrasulfide (TESPT), the corresponding disulfide (TESPD), or else mixtures of the sulfides having 1 to 8 sulfur atoms with different contents of the various sulfides. TESPT can, for example, also be added as a mixture with industrial carbon black (trade name X50S® from Evonik).

Preference is given to using a silane mixture which contains 40% to 100% by weight of disulfides, more preferably 55% to 85% by weight of disulfides and most preferably 60% to 80% by weight of disulfides. A mixture of this kind is available, for example, under the Si 261® trade name from Evonik, which is described, for example, in DE 102006004062 A1.

Blocked mercaptosilanes, as are known, for example, from WO 99/09036, can also be used as silane coupling agent. Silanes as described in WO 2008/083241 A1, WO 2008/083242 A1, WO 2008/083243 A1 and WO 2008/083244 A1 can also be used. It is possible to use, for example, silanes which are marketed under the name NXT in a number of variants from Momentive, USA, or those which are marketed under the name VP Si 363® by Evonik Industries.

It is also conceivable that one of the abovementioned mercaptosilanes, especially 3-mercaptopropyltriethoxysilane, is used in combination with processing aids (that are listed below), especially PEG carboxylates.

In a preferred embodiment of the invention, the rubberizing mixture comprises a combination of 3-mercaptopropyltriethoxysilane and PEG carboxylates, which results in particularly good properties, especially with regard to the technical problem to be solved, and a good level of properties overall with regard to the other properties.

In addition, the rubberizing mixture may comprise further activators and/or agents for the incorporation of fillers, especially carbon black. The latter may, for example, be the compound S-(3-aminopropyl)thiosulfuric acid disclosed, for example, in EP 2589619 A1, and/or metal salts thereof, which gives rise to very good physical properties of the rubberizing mixture especially in combination with at least one carbon black as filler.

It is also possible for 0 to 70 phr, preferably 0.1 to 60 phr, of at least one plasticizer to be present in the rubberizing mixture. Such plasticizers include all plasticizers known to those skilled in the art, such as aromatic, naphthenic or paraffinic mineral oil plasticizers, for example MES (mild extraction solvate) or TDAE (treated distillate aromatic extract), or rubber-to-liquid oils (RTL) or biomass-to-liquid oils (BTL; as disclosed in DE 10 2008 037714 A1) or oils based on renewable raw materials (for example rapeseed oil, terpene oils (e.g. orange oils)) or factices or plasticizer resins or liquid polymers (such as liquid BR), the average molecular weight of which (determined by GPC=gel permeation chromatography, using a method based on BS ISO 11344: 2004) is in the range from 500 to 20 000 g/mol. If liquid polymers are used as plasticizers in the rubberizing mixture, these are not counted as rubber in the calculation of the composition of the polymer matrix (phr calculation).

When mineral oil is used, it is preferably selected from the group consisting of DAE (distilled aromatic extracts) and/or RAE (residual aromatic extracts) and/or TDAE (treated distilled aromatic extracts) and/or MES (mild extracted solvents) and/or naphthenic oils.

Furthermore, the rubberizing mixture may comprise standard additives in customary proportions by weight. These additives include A) aging stabilizers, for example N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydroquinoline (TMQ),
B) activators, for example zinc oxide and fatty acids (e.g. stearic acid),
C) waxes,
D) resins, especially tackifying resins that are not plasticizer resins,
E) methylene acceptors, such as resorcinol and resorcinol equivalents, and/or methylene donors/formaldehyde donors, for example hexamethoxymethylmelamine (HMMM) and/or hexamethylenetetramine (HMT), or resorcinol substitute such as phenolic resins and modified phenolic resins,
F) masticating aids, for example 2,2'-dibenzamidodiphenyl disulfide (DBD) and
G) processing aids, for example fatty acid salts, for example zinc soaps, and fatty acid esters and derivatives thereof, for example PEG carboxylates.

The vulcanization is conducted in the presence of sulfur and/or sulfur donors, and some sulfur donors can simultaneously act as vulcanization accelerators. Sulfur or sulfur donors are added to the rubberizing mixture in the last mixing step in the amounts that are commonly used by the person skilled in the art (0.4 to 8 phr, sulfur preferably in amounts of 0.4 to 4 phr). The vulcanization can also be effected in the presence of very small amounts of sulfur in combination with sulfur donor substances.

In addition, the rubberizing mixture may comprise vulcanization-influencing substances such as vulcanization accelerators, vulcanization retardants and vulcanization activators in customary amounts, in order to control the time required and/or the temperature required in the vulcanization and to improve the vulcanizate properties. The vulcanization accelerator may, for example, be selected from the following groups of accelerators: thiazole accelerators, for example 2-mercaptobenzothiazole, sulfenamide accelerators, for example benzothiazyl-2-cyclohexylsulfenamide (CBS), guanidine accelerators, for example N,N'-diphenylguanidine (DPG), dithiocarbamate accelerators, for example zinc dibenzyldithiocarbamate, disulfides, thiophosphates. The accelerators can also be used in combination with one another, which can give rise to synergistic effects.

The rubberizing mixture is produced in a conventional manner, by first generally preparing a base mixture containing all the constituents except for the vulcanization system (sulfur and vulcanization-influencing substances), in one or more mixing stages, and subsequently producing the finished mixture by adding the vulcanization system. Subsequently, the mixture is processed further.

The strengthening members are likewise rubberized in a manner known to those skilled in the art.

Further processing to give a strengthening member ply in a green tyre is likewise effected in a manner known to those skilled in the art.

For example, the strengthening members are calendered together with the rubberizing mixture and cut to size, and the rubberized strengthening members ply thus obtained is laid on at the appropriate point in the tyre construction machine.

Preferably, the strengthening members in step f) are processed at least in the carcass ply and/or the belt and/or a bandage and/or the bead reinforcement. It is also conceivable here that the strengthening members treated in accordance with an aspect of the invention as described are used in all the components mentioned, resulting in the advantages mentioned above with regard to the substances and the simplification of production and adequate bonding. The bandage is especially one or more belt bandages.

An aspect of the present invention further provides a motor vehicle tyre produced by the method according to an aspect of the invention. All the above details are applicable here. The motor vehicle tyre of an aspect of the invention has a comparatively simple mode of production, dispensing with resorcinol and formaldehyde, substances that are harmful to health and the environment.

An aspect of the present invention further provides for the use of textile strengthening members produced by the method comprising at least the following method steps in industrial rubber articles, such as especially belts, especially conveyor belts, transmission belts, especially drive belts, hoses, strip belts, especially transport belts, and air bellows:
  a) providing textile strengthening members;
  b) providing a bath free of free resorcinol and resorcinol precondensates, especially resorcinol-formaldehyde precondensates, and free of free formaldehyde and formaldehyde-releasing substances, by means of at least the following method steps:
    b1) adding at least one polycarboxylic acid to water; and
    b2) adding at least one base; and
    b3) adding at least one epoxy compound; and
    b4) adding at least one polyisocyanate compound; and
    b5) adding at least one VP latex; and
    b6) mixing the substances from b1) to b5);
  c) dipping the strengthening members from step a) in the bath from step b);
  d) subsequently hot-drawing the dipped strengthening members from step c).

All the above details are applicable to the method. Through the use of the strengthening members treated as described in industrial rubber articles, they have a comparable service life, and it is possible to dispense with resorcinol and formaldehyde, substances that are harmful to the environment and health, in the bath for the strengthening members.

Otherwise, the industrial rubber articles are produced using the treated strengthening members by methods and with devices known in the prior art.

An aspect of the invention is now to be elucidated in detail with reference to the examples which follow.

Cords made from nylon (PA $6.6^{a)}$) were provided and dipped in a comparative bath (from the prior art, based on resorcinol-formaldehyde latex RFL) and also in inventive baths (free of resorcinol and formaldehyde RF) according to the details in Table 1.

In addition, non-bonding-activated cords made from a polyester ($PET^{b)}$) were provided and dipped in the baths mentioned. In the case of the RFL bath (comparative bath from the prior art), the non-bonding-activated PET cords ($PET^{b)}$) had to be pretreated$^{k)}$ in a pre-dip (preliminary dip bath containing 95.26% by weight of water and 0.90% by weight of Denacol EX313$^{h)}$ and 3.84% by weight of Grilbond IL6$^{i)}$) by dipping therein. In the case of the bath of an aspect of the invention, the non-bonding-activated cords ($PET^{b)}$) were firstly pretended$^{k)}$ with the abovementioned pre-dip and secondly used without pre-dip$^{b)}$.

Materials Used
a) nylon-6,6 (nylon): cords made from 2 yarns: 940 dtex x2; weave made from the cords at 80 epdm (ends per decimetre; measure of the cord density in the textile ply)
b) polyethylene terephthalate (PET): cords made from 2 yarns: 1440 dtex x2; weave made from the cords at 121 epdm; not bonding-activated
c) aqueous solution; 25% by weight of ammonium hydroxide
d) aqueous solution; 50% by weight of sodium hydroxide
e) resorcinol-formaldehyde precondensate: solids content 75% by weight in aqueous solution
f) aqueous solution: 37% by weight of formaldehyde
g) acrylic resin (polycarboxylic acid): solids content 50% by weight in aqueous solution
h) epoxy compound: glycerol-based polyglycidyl ether
i) polyisocyanate compound: solids content 60% by weight in aqueous solution
j) vinylpyridine latex: 41% by weight of VP polymer in water
k) bonding activation by means of a preliminary dip bath containing 95.26% by weight of water and 0.90% by weight of Denacol EX313$^{h)}$ and 3.84% by weight of Grilbond IL6$^{i)}$
l) no bonding activation by means of a preliminary dip bath

TABLE 1

| Constituents | RFL bath, % by PA6.6$^{a)}$/PET$^{b): + k)}$ | RF-free bath, % by wt. PA6.6$^{a)}$ | PET$^{b): + k) or l)}$ |
|---|---|---|---|
| Water | 46.49 | 60.41 | 49.54 |
| NH$_4$OH$^{c)}$ | 2.25 | 0.28 | 0.13 |
| NaOH$^{d)}$ | 0.17 | | |
| Penacolite$^{e)}$ | 3.14 | | |
| Formaldehyde$^{f)}$ | 2.28 | | |
| Acrodur 950 L$^{g)}$ | | 0.79 | 0.36 |
| Denacol EX313$^{h)}$ | | 1.15 | 1.60 |
| Grilbond IL6$^{i)}$ | | 3.25 | 4.52 |
| VP latex$^{j)}$ | 45.67 | 34.12 | 43.85 |

After dipping and subsequent hot-drawing, the strengthening members were each ensheathed with a rubberizing mixture according to Table 2.

TABLE 2

| Constituents of rubberizing mixture | Amount |
|---|---|
| Natural rubber | 70 |
| SBR | 30 |
| N660 carbon black | 50 |
| Zinc oxide | 4 |
| Stearic acid | 2 |
| Oil | 5 |
| Penacolite (resorcinol-formaldehyde) | 3 |
| Hexamethoxymethyl melamine | 2 |
| 2,2,4-Trimethyl-1,2-dihydroquinoline | 1.8 |
| Sulfur | 2.5 |
| 2,2'-Dibenzothiazyl disulfide (MBTS) | 0.8 |

For all the strengthening members described, a bonding test with the abovementioned rubberizing mixture was conducted to ISO 36:2011. The vulcanized samples were heated to 120° C. for 30 min and the bonding test was conducted within 30 seconds after removal from the oven. The assessment of the bonding force was conducted to DIN ISO 6133. In addition, the peel area was assessed on a scale from 0 to 10 with regard to the coverage with rubberizing mixture. This assessment was effected by visual checking according to ASTM D4393. For each example, the bonding force reported and the coverage reported are the mean value from three measurements in each case.

The results are collated in Table 3.

TABLE 3

|  | RFL bath (comparison) | | RF-free bath (invention aspect) | |
|---|---|---|---|---|
|  | Peel force (%) | Coverage | Peel force (%) | Coverage |
| PA6.6[a) | 100% | 9 | 104% | 9 |
| Polyester[b)+] | 100% | 10 | 101% | 10 |
| Polyester[b)+] |  |  | 111%[m)] | 10 |

[m)]based on polyester
[b) + b)]with RFL bath and pre-dip

As apparent in Table 3, the strengthening members that have been treated in accordance with an aspect of the invention have comparable or even improved bonding.

The non-bonding-activated PET strengthening members (PET[b)]) in particular, by means of the above-specified RF-free bath according to an aspect of the invention, were treatable in that bath alone without the need for a pre-dip as in the case of the RFL bath from the prior art.

The motor vehicle tyre or industrial rubber article produced in accordance with an aspect of the invention using the strengthening members treated in accordance with an aspect of the invention therefore has a comparable service life, and it is possible to dispense with resorcinol and formaldehyde, substances that are harmful to the environment and health, in the bath for the strengthening members.

The invention claimed is:

1. A method of producing a motor vehicle tire comprising at least one strengthening member ply having textile strengthening members, the method comprising:
   a) providing textile strengthening members;
   b) providing a bath free of free resorcinol and resorcinol precondensates, especially resorcinol-formaldehyde precondensates, and free of free formaldehyde and formaldehyde-releasing substances, by at least the following method steps:
      b1) adding at least one polycarboxylic acid to water; and
      b2) adding at least one base; and
      b3) adding at least one epoxy compound; and
      b4) adding at least one polyisocyanate compound; and
      b5) adding at least one VP latex; and
      b6) mixing the substances from b1) to b5);
   c) dipping the strengthening members from step a) in the bath from step b);
   d) subsequently hot-drawing the dipped strengthening members from step c) at a temperature of 100° C. to 260° C.;
   e) further processing the strengthening members from step d) to give a strengthening member ply in a green motor vehicle tire; and
   f) vulcanizing the green motor vehicle tire.

2. The method as claimed in claim 1, wherein the textile strengthening members in step a) are selected from the group consisting of polyethylene terephthalate (PET), polyethylene naphthalate (PEN), polybutylene terephthalate (PBT), polycarbonate (PC), celluloses, regenerated celluloses, cellulose esters, carbon fibres, polyketones, m-aramid, p-aramid, mixtures of m-aramid and p-aramid, and polyamides selected from the group consisting of nylon-4,6 (PA 4.6), nylon-4,10 (PA 4.10), nylon-6 (PA 6), nylon-6,6 (PA 6.6 polyhexamethyleneadipamide), nylon-6,12 (PA 6.12), nylon-10,10 (PA 10.10) and nylon-12,12 (PA 12.12), also including a combination of two or more of all the textile strengthening members mentioned.

3. The method as claimed in claim 1, wherein the polycarboxylic acid in step b1) is based to an extent of 10 to 100 mol % on monomers containing carboxylic acid groups.

4. The method as claimed in claim 1, wherein the polycarboxylic acid in step b1) has a weight-average molecular weight $M_w$ by GPC of 1000 to 500 000 g/mol.

5. The method as claimed in claim 1, wherein the polycarboxylic acid in step b1) is an acrylic resin.

6. The method as claimed in claim 1, wherein the polycarboxylic acid includes a polyalcohol as crosslinker.

7. The method as claimed in claim 1, wherein the base used in step b2) is ammonium hydroxide.

8. The method as claimed in claim 1, wherein the epoxy compound in step b3) is selected from the group consisting of glycidyl-based glycerol, sorbitol-based epoxy compounds, phenol-based novolak epoxy compounds and cresol-based novolak epoxy compounds.

9. The method as claimed in claim 1, wherein the polyisocyanate compound in step b4) comprises units selected from the group consisting of tetramethylene diisocyanate, hexamethylene diisocyanate, diphenylmethane 4,4'-diisocyanate, octamethylene diisocyanate, decamethylene diisocyanate, dodecamethylene diisocyanate, aromatic diisocyanates comprising toluene 2,4- or 2,6-diisocyanate, tetramethylxylylene diisocyanate, p-xylene diisocyanate, 2,4'- or 4,4'-diisocyanatodiphenylmethane, phenyl 1,3- or 1,4-diisocyanate.

10. The method as claimed in claim 1, wherein the bath from step b6) contains the polycarboxylic acid in an amount of 0.1%-10% by weight, preferably 0.1%-2% by weight, the epoxy compound in an amount of 0.1% to 2% by weight, the blocked polyisocyanate compound in an amount of 0.7% to 3% by weight, and the at least one VP latex in an amount of 6% to 25% by weight.

11. The method as claimed in claim 1, wherein the strengthening members in step f) are processed at least in the carcass ply and/or the belt and/or a bandage and/or the bead reinforcement.

12. A motor vehicle tyre produced as claimed in claim 1.

13. The method as claimed in claim 2, wherein the polycarboxylic acid in step b1) is based to an extent of 10 to 100 mol % on monomers containing carboxylic acid groups.

* * * * *